Feb. 22, 1944.                    W. HOPPE                    2,342,584
                                WRAPPER FEED
                            Filed Dec. 8, 1941                7 Sheets-Sheet 1

INVENTOR
WILLIAM HOPPE
BY Chapin & Neal
ATTORNEYS

Feb. 22, 1944. W. HOPPE 2,342,584
WRAPPER FEED
Filed Dec. 8, 1941 7 Sheets-Sheet 2
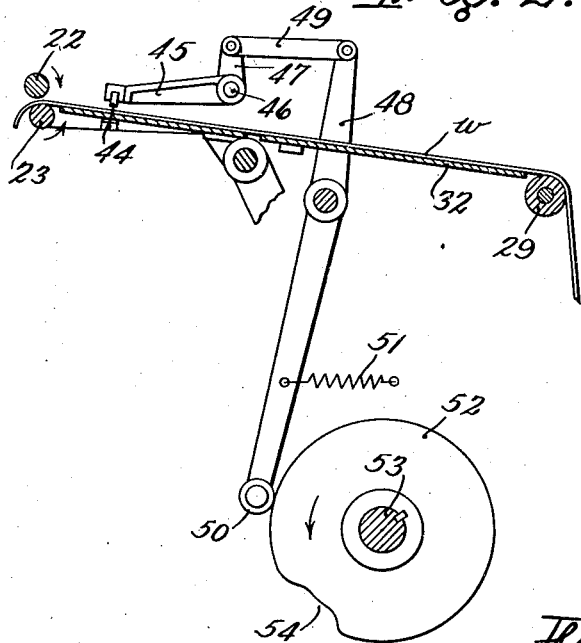
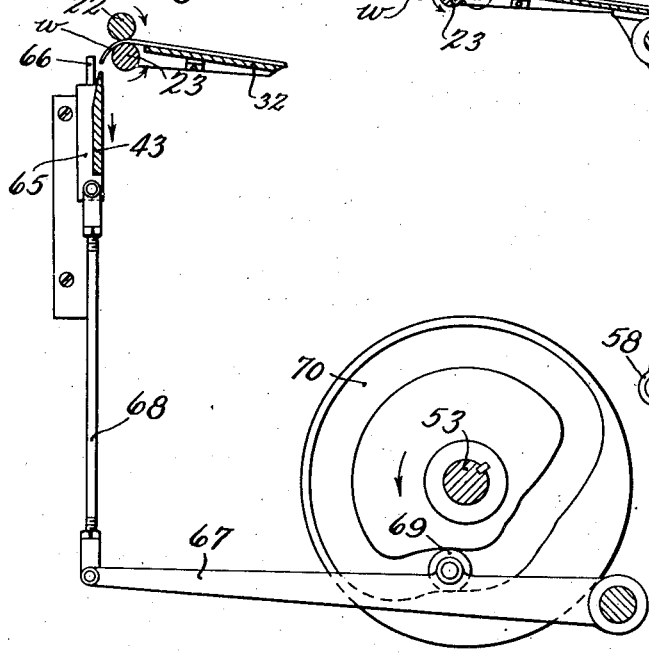
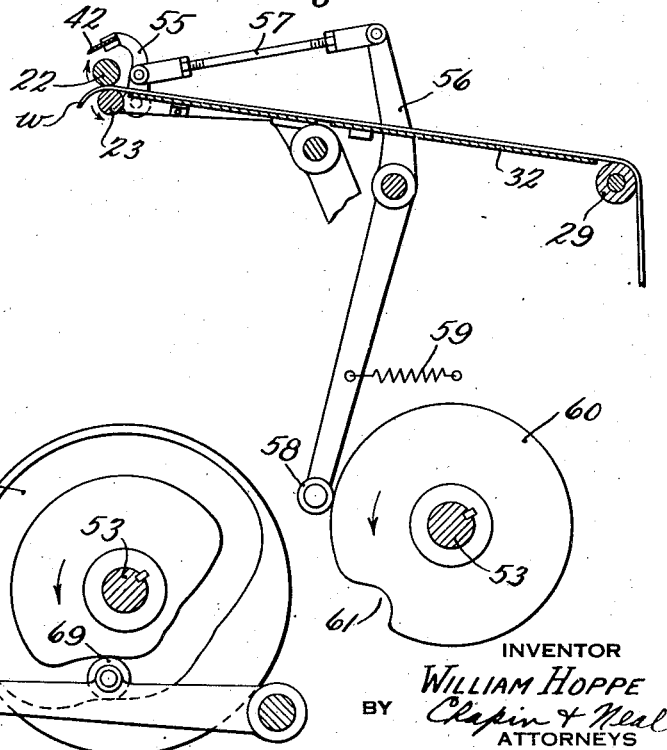
INVENTOR
WILLIAM HOPPE
BY Chapin & Neal
ATTORNEYS

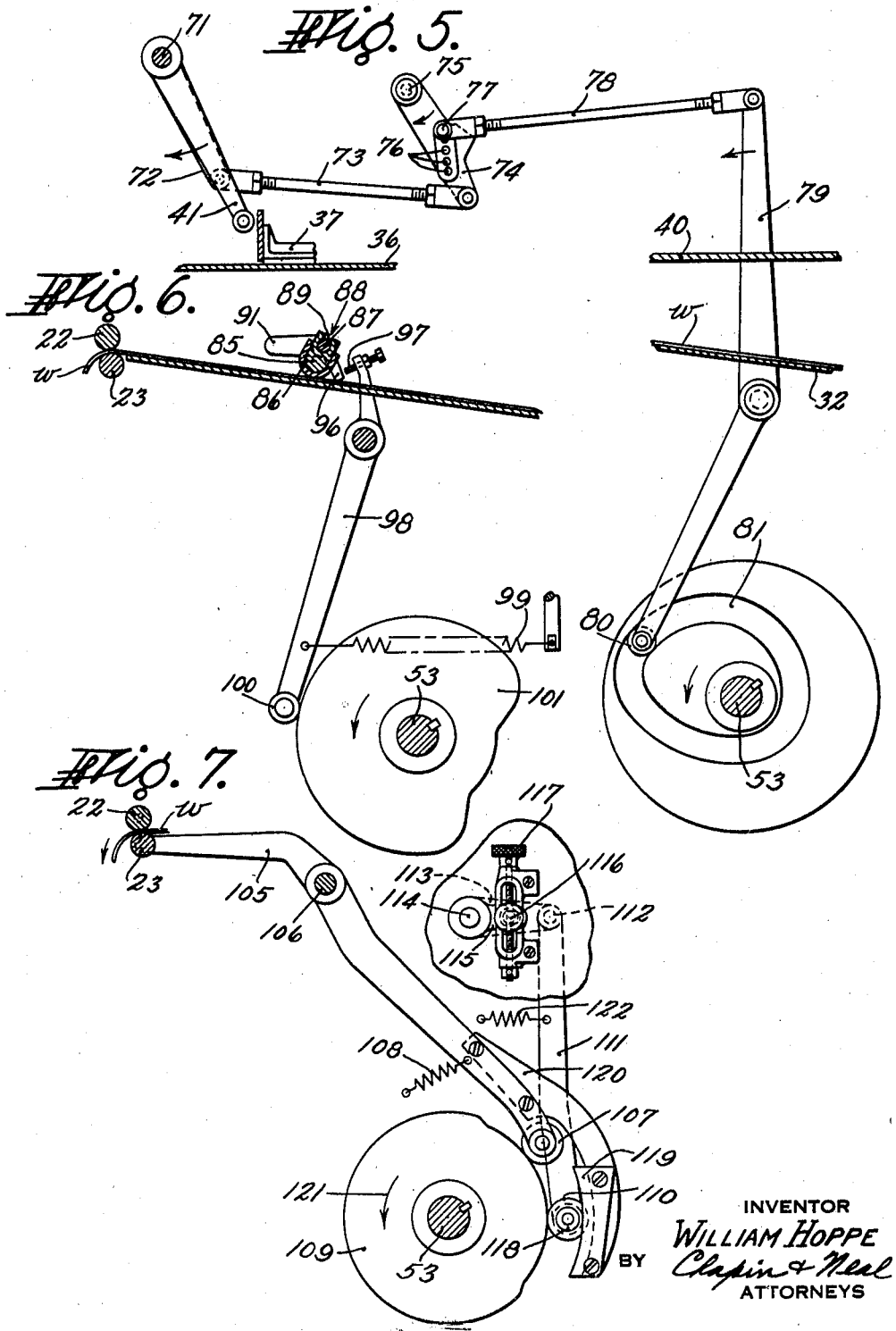

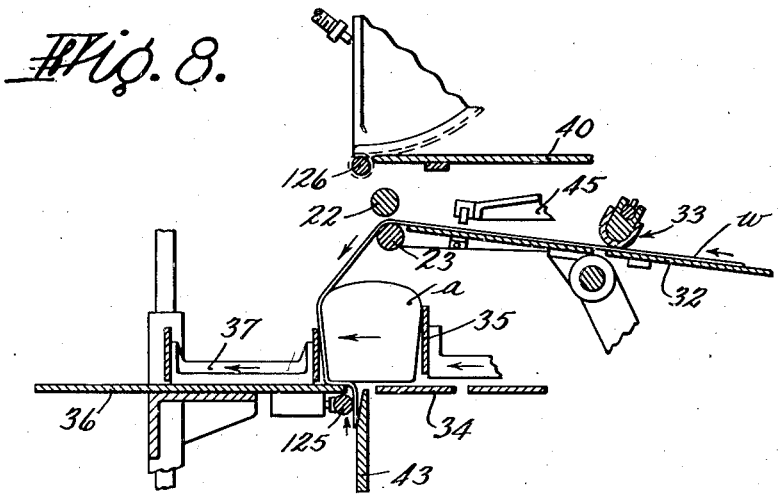
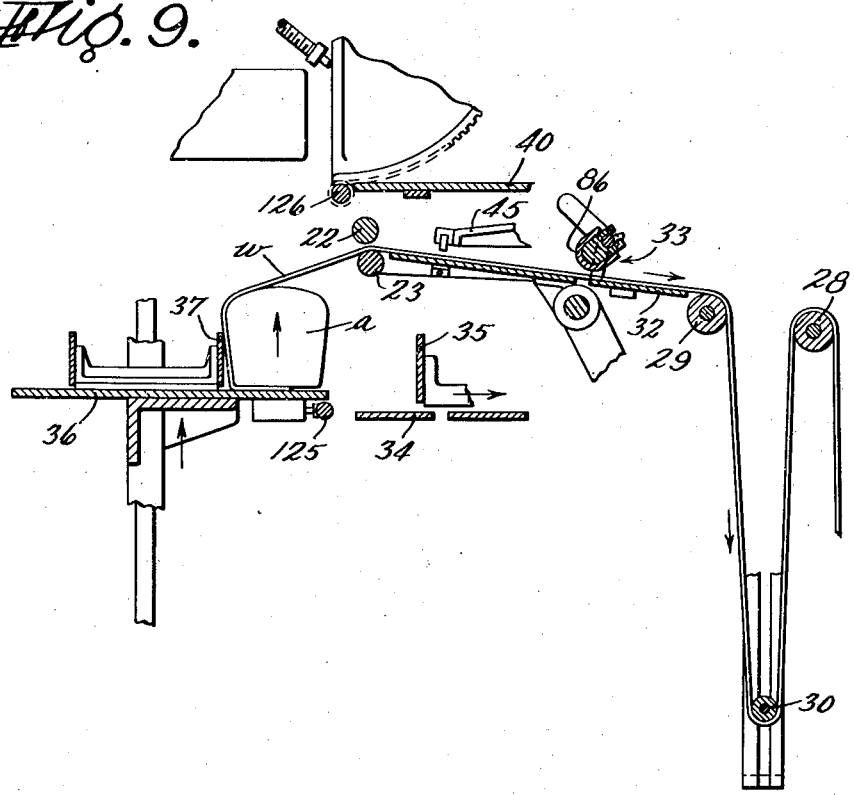

Feb. 22, 1944. W. HOPPE 2,342,584
WRAPPER FEED
Filed Dec. 8, 1941 7 Sheets-Sheet 5
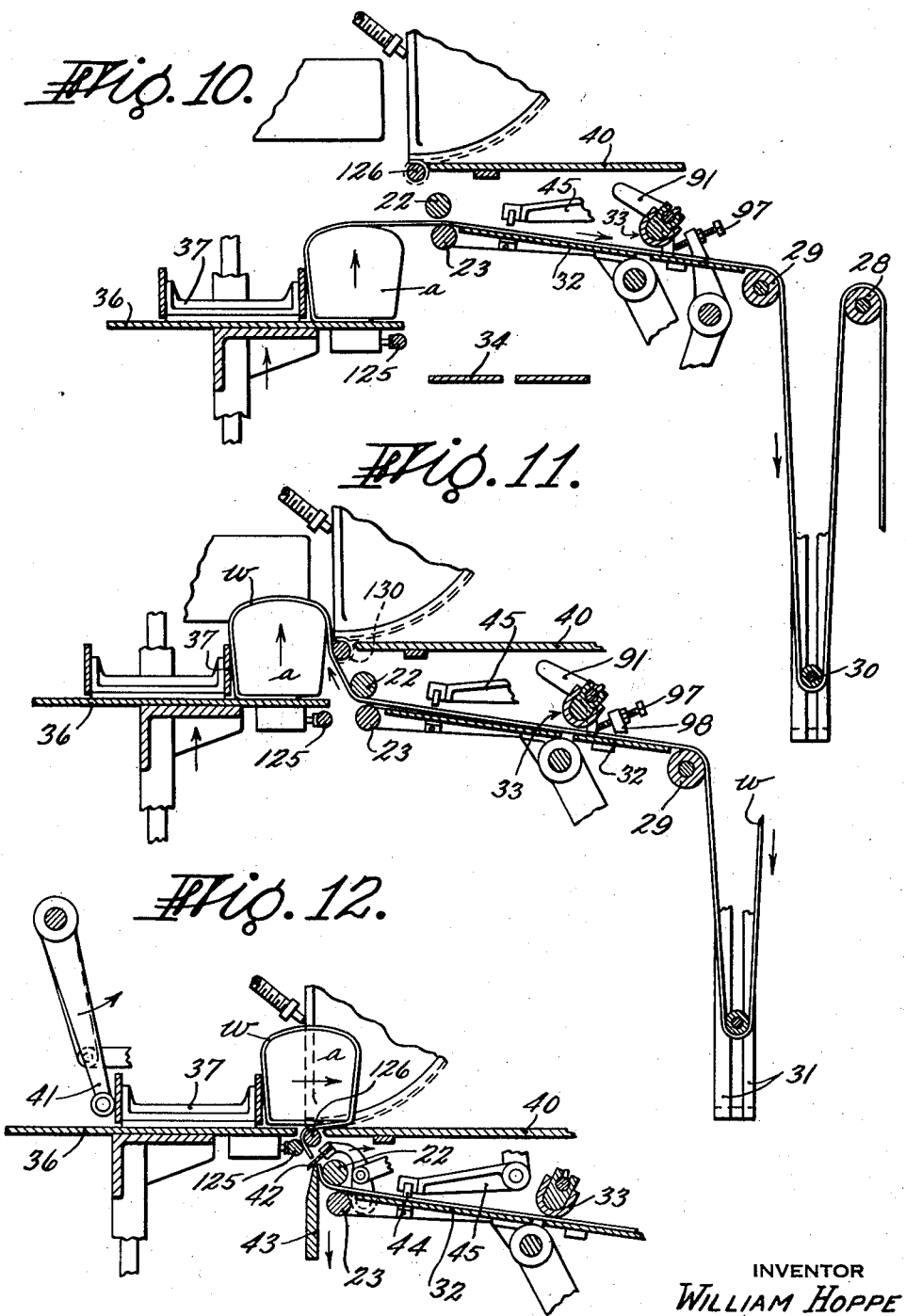

Feb. 22, 1944. W. HOPPE 2,342,584
WRAPPER FEED
Filed Dec. 8, 1941 7 Sheets-Sheet 6

INVENTOR
WILLIAM HOPPE
BY Chapin & Neal
ATTORNEYS

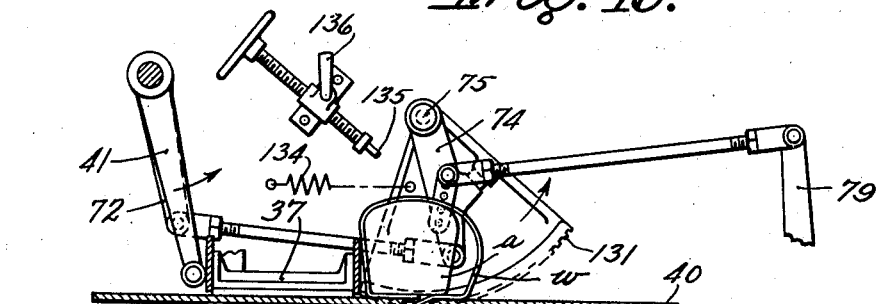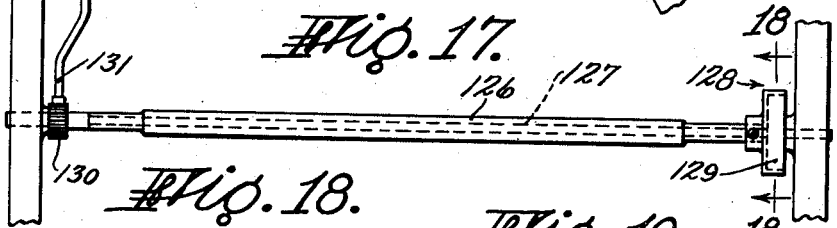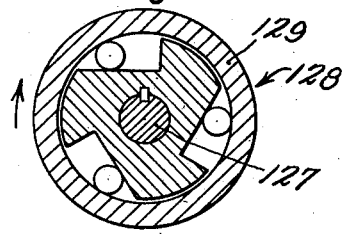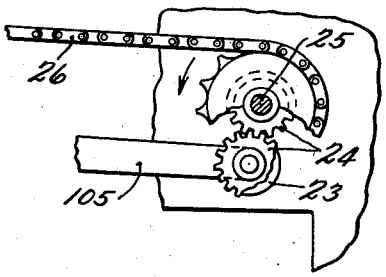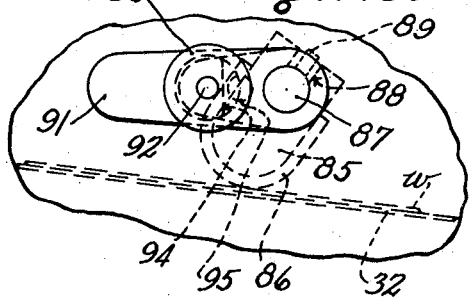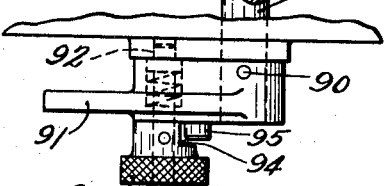

Patented Feb. 22, 1944

2,342,584

UNITED STATES PATENT OFFICE 2,342,584

WRAPPER FEED

William Hoppe, Longmeadow, Mass., assignor to National Bread Wrapping Machine Co., Springfield, Mass., a corporation of Massachusetts Application December 8, 1941, Serial No. 422,048

15 Claims. (Cl. 93—2)

This invention relates to mechanism for feeding and controlling the wrapper web in wrapping machines of the type in which the feeding of the web is in part accomplished by the movement of the article, which movement circumferentially wraps the article in the leading end of the web. In particular the invention relates to the wrapping of articles which are not perfectly constant and regular in their shape, such as loaves of bread. Bread loaves vary in the baking so that the portion above the pan will vary both in size and contour, and in draping a wrapper around them it is necessary to vary the length of wrapper delivered to each loaf and also the rate of feed of the wrapper so that it will neither be strained nor left slack. A wrapper feed having these desired characteristics is shown in my prior application Serial No. 344,679, filed July 10, 1940, now Patent No. 2,273,961, granted Feb. 24, 1942, and in one aspect the present invention relates to improvements in the mechanism there shown.

It is a general object of the invention to provide greater flexibility in meeting operating conditions due to variations in the size, shape and physical character of the article being wrapped and secure a more uniform product under these differing conditions.

A particular object of the invention is to provide a mechanism by which the formation of undesired slack at any point in the circumferential wrapping of the article will be avoided.

A further object is to provide improved mechanism by which the wrapping of the article may be varied in the snugness with which the wrapper encircles the article, the wrapper being made as tight or as loose as may be desired, and to provide adjusting mechanism for this purpose the setting of which may be changed during the continued operation of the wrapping machine.

A further object of the invention is to provide a control operable during the running of the machine to vary the amount of overlap of the two ends of the wrapper.

The manner in which these, and other objects which will appear below, are accomplished will now be described with reference to the accompanying drawings, in which Fig. 1 is a longitudinal section through a wrapping machine embodying the present inventions, all parts not necessary for an understanding of present structure being omitted;

Fig. 2 is a detail of the operating mechanism for the web brake;

Fig. 3 is a similar detail of the upper knife mechanism;

Fig. 4 is a similar detail of the lower knife mechanism;

Fig. 5 is a similar detail of the discharge pusher mechanism;

Fig. 6 is a similar detail of the web retainer mechanism;

Fig. 7 is a similar detail of the adjustable mechanism for controlling the length of wrapper fed out prior to contact with the article and thus for controlling the length of the first underfold;

Figs. 8 to 12 are views showing successive stages in the wrapping of an article;

Figs. 13 to 16 are details showing the operation of the tight and loose wrap control;

Fig. 17 is a detail of the tight and loose wrapping mechanism;

Fig. 18 is a section on line 18—18 of Fig. 17;

Fig. 19 is a detail of the drive for the web feed rolls;

Fig. 20 is a detail of the web retainer; and

Fig. 21 is a fragmentary top plan thereof.

Figure 1:
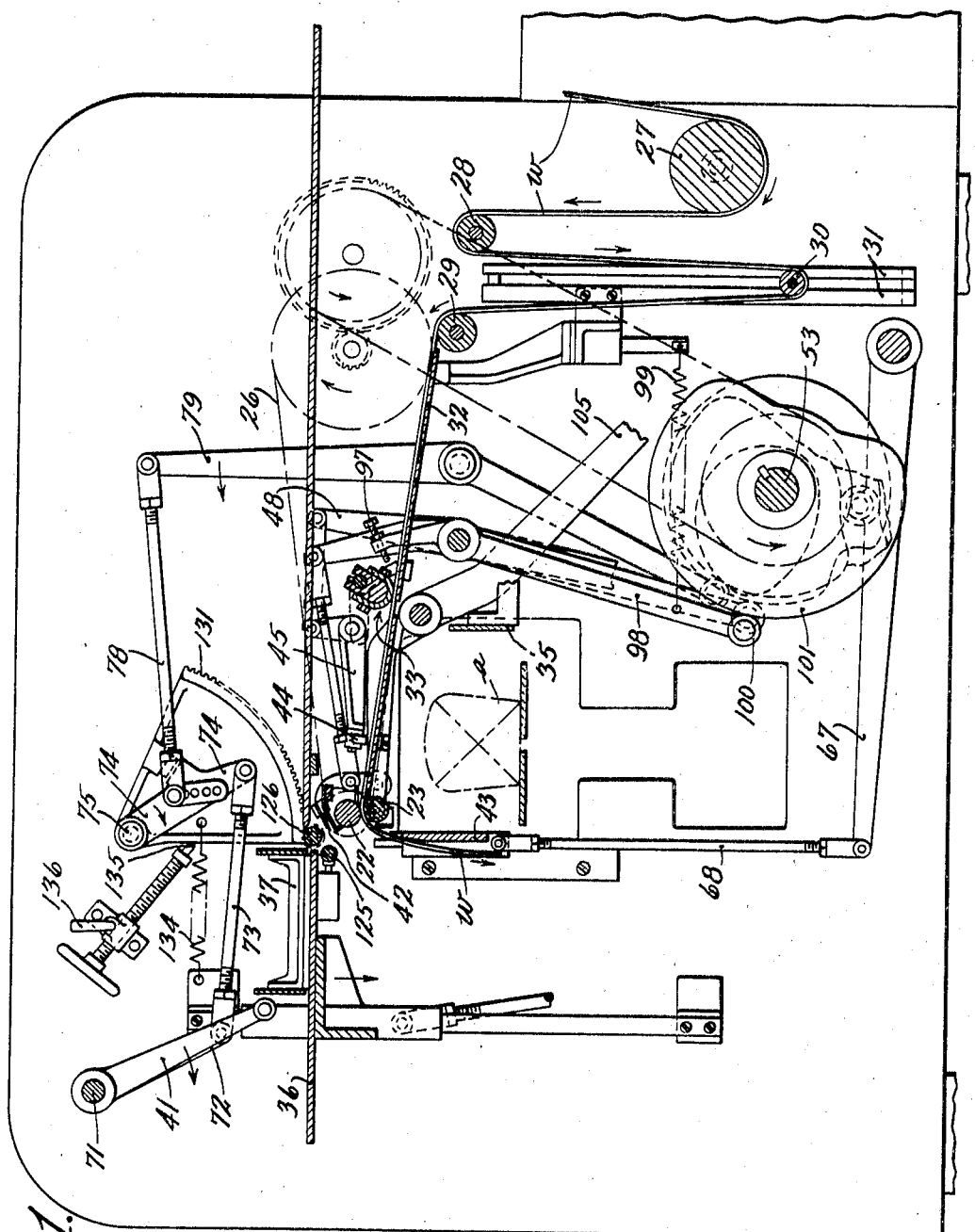

As in the prior case referred to above, the wrapper web is delivered to the article between a pair of continuously running feed rolls 22, 23 which are alternately held together to feed a determined length of web positively and are then separated to feed the web only when the article is so moved as to snub the web around one or the other of the rolls. The rolls are connected together by spur gearing 24 (Fig. 19), and are moved apart during the snubbing periods only enough to avoid gripping the web but not enough to shift the gears out of mesh. The upper one 22 of the rolls is carried by a shaft 25 which may be driven as by a chain 26 from any desired continuously operating source. The web w is supplied to the rolls from a suitable reel, not shown, from which it passes around a constantly rotating roll 27 which acts to feed the web from the reel whenever the web is looped tightly around it. The web then passes over freely running guide rolls 28, 29 between which is a floating take-up or festoon roll 30 traveling in vertical guides 31 and acting in the usual manner to keep the web under constant tension. The web passes from guide roll 29 to the feed rolls 22, 23 over a table 32 and under a hold-back device or retainer 33 of a novel construction which will be described below. The table is preferably jointed, and the front portion pivoted with the lower roll 23 upon the pivot 106 later to be described. By swinging the lower roll and the front portion of the table downwardly in excess of the normal movement of the roll, threading-in of a new wrapper web is greatly facilitated.

The feed rolls are held together during a determined period, thereby feeding the leading end of the web far enough out to hang in front of a feeding station 34 on which a loaf a is positioned by any suitable mechanism such for example as that described in the Smith and Hoppe Patent 1,953,195. That patent shows a very different paper feed, but the remainder of the mechanism is in general similar to that in which the present novel web feeding mechanism is placed. The loaf is advanced as by a pusher 35 onto a vertically reciprocable elevator on carrier 36 having a frictionally held backing plate 37 and moved vertically by mechanism similar to that shown in the Smith and Hoppe patent referred to or in the Lyon Patent 2,082,408, June 1, 1937. As the loaf passes onto the elevator the web will be drawn tightly around the lower roll 23 which at this time is spaced from the upper roll but is constantly rotating. As the elevator ascends the tendency to draw the web out from between the rolls is lessened, and it may even result that there is a tendency to form slack between the loaf and the rolls as will be evidenced from a comparison of Figs. 9 and 10. In order to prevent such slack from forming, the retainer 33 is elevated during this period by mechanism to be described, permitting the floating roll 30 to draw back the length of web between it and the loaf and to keep this portion of the web taut. It should be observed that during this period the web is extending practically in a straight line between the forwarding rolls and makes too small a bend around either of them to cause these rolls to assist in the advance of the web by the snubbing action they have in other positions of the elevator. As the elevator continues to ascend the web will be bent around the upper roll 22 and the drawing action of the moving loaf will be assisted by the frictional force of the upper feed roll. The retainer may be maintained free from the paper during this period.

In its uppermost position the loaf is positioned in line with the floor 40 of a wrapping channel and is pushed off from the elevator and onto this floor by a swinging arm 41 which contacts with the rear end of the frictional backing member 37 as shown in Fig. 12. During this period the web is severed by the action of a rocking upper knife 42 against a lower knife bar 43. Subsequent to this severing operation bar 43 is reciprocated from its cutting position of Fig. 12 to a lower position shown in Fig. 1 where it does not interfere with the feeding of a web beyond the rolls but serves to guide the web into its correct position. During the severing operation the web is held by a brake 44 and the retainer 33 is allowed to drop back upon the web. These various mechanisms will be described in detail before certain additional functions of the machine are considered.

The web brake mechanism is shown in Fig. 2. It consists of an arm 45 carrying the brake member 44, which is a rubber pad adapted to press the paper against the table 32. This arm is carried upon a shaft 46, bears an arm 47 connected to a lever 48 by a link 49. The lower end of the lever carries a roll 50 which is pressed by a spring 51 against a cam 52 on a shaft 53. This cam has a depression 54 of short circumferential extent so that during the cutting operation the brake will be held by the spring 51 against the web and will be almost immediately released.

The upper knife member 42 is carried on a swinging arm 55 joined to the upper end of a lever 56 and a link 57. The lower end of the lever bears a cam roll 58 held by a spring 59 against a cam 60 having a localized depression 61 causing actuation of the knife. When the knife is swung downwardly it coacts with the upper edge of the knife bar 43 which is carried on a slide 65 reciprocable on guides 66 by a horizontal lever arm 67 to which it is connected by a link 68. The arm 67 carries a cam roll 69 running in a cam groove 70 formed on a disk carried by a shaft 53. As stated above, this knife bar has a double function. In the first place it remains in its uppermost position during the severing operation and then it descends slowly so as to keep just behind the leading end of the web and guide this into position across the front of the oncoming loaf. During the balance of the cycle the knife bar remains lowered.

Fig. 5 shows the discharge mechanism which, as will be described below, is connected with the tight and loose wrapping mechanism. The swinging arm 41 is carried by a cross shaft 71 to which is secured an arm 72 connected by a link 73 with a swinging arm 74 on a pivot shaft 75. The arm 74 is provided with a series of holes 76 in which a pin 77 may connect a link 78. The link is coupled to the upper end of a rocker 79 having at its lower end a cam roll 80 running in a cam track 81 formed in a disk on the shaft 53. The holes 76 are provided for adjusting the stroke of the ejector arm 41 but are so positioned as to be substantially on an arc drawn from the pivot point of link 78 on the rocker 79. By this means the forward position of the backing plate 37 will be constant throughout all adjustments but the rearward stroke of the ejector may be regulated to take care of the different distances the backing plate may be pushed by loaves of different widths as they enter the elevator.

The retainer is shown in mechanical detail in Figs. 6, 20 and 21. It comprises a member 85 having a frictional surface 86 preferably of rubber or leather and pivoted loosely on a cross shaft 87. The upper end of the member has a slot 88 adapted to receive a pin 89 on the shaft so that, while within limits the member is free of the shaft, it can be raised from the web by turning the shaft in a clockwise direction as viewed in Fig. 20. To one end of the shaft is pinned at 90 an arm 91 having a spring pressed pin 92 adapted to enter a hole in the side of the frame. The pin has an enlarged head 93 with one side slabbed off at 94. In the position shown in Fig. 21 this flat side clears a pin 95 projecting from the arm 91. If, however, the knob be pulled out and rotated half a turn it will rest upon the top of the pin 95 and hold the pin 92 out of the hole. With the parts in the position shown in Fig. 21 the shaft will be held in a stationary position with the pin 89 midway of the slot 88. As will be seen in Fig. 6, the shaft 87 has an arm 96 which is periodically struck by an adjustable screw 97 on the upper end of a rocker 98. A spring 99 holds a cam roll 100 on this rocker against a cam 101 on the shaft 53. When the roll 100 passes onto a low point of the cam the shaft 87 will be rocked sufficiently to make contact between the pin 89 and one side of the slot 88 and thus raise the paper retainer free from the web. If the knob 93 is in the position shown in Fig. 21 contact will be made between the parts 96 and 97 as before but the spring 99 will be unable to cause motion of the shaft and the roll 100 will not descend into the low part of the cam. The cam is so designed that during at least part of the period when the rolls 21 and 22 are separated the retainer will be free of the web permitting the latter to be kept under tension by the roll 30 which floats in a loop of the web. The formation of slack as the article passes the position of Fig. 10 is thus completely eliminated.

In the machine described in the prior application referred to, the period during which the rolls 22 and 23 are held together can be adjusted by a variable cam, but it was necessary to interrupt the operation of the machine in order to make the adjustment. It will be recalled that the length of time the rolls are in contact determines the amount or the length of the web that is fed down in front of the article as it passes from the position of Fig. 1 onto the elevator. The end of the web extends below the article, and as the latter moves onto the elevator this portion of the web will be folded underneath it thereby forming the inner of the two flaps that are to overlap upon the article bottom. The position of the last flap is determined by the cutting point and, due to the construction of the cutting blades described above, it is fixed. For articles of different size or to change the amount of overlap as may be desired it is necessary therefor to alter the length of web fed out by the rolls prior to contact between the web and the article. In the present case the lower roll 23 is carried upon a rocker 105 pivoted upon a shaft 106 and bearing a roll 107 at its lower end. This roll is acted by a spring 108 against a cam 109 on the shaft 53. Also riding against the same cam is a roll 110 on a link 111 pivoted at 112 to an arm 113. This arm is pivoted at 114 to the frame and is coupled to a second arm 115 carrying a nut 116 which may be raised and lowered by an adjusting screw 117. On the same pivot as the cam roll 110 is a second roll 118 adapted to contact with a shoe 119 carried by an arm 120 supported from the rocker 105.

As the cam 109 rotates in the direction of the arrow 121, the low portion of the cam by which the rolls 22 and 23 are brought into contact will first arrive at the roll 110. This roll will be drawn toward the shaft 53 by a spring 122 and will therefore free the shoe 119. No movement of the rocker 105 can, however, occur since the roll 107 is still supported by the high part of the cam. The time at which the rolls 22 and 23 are closed is therefore fixed. When the high part of the cam comes around, however, a different condition prevails. This will first contact the roll 110 forcing it and the shoe 119 away from the shaft 53. Movement of the rocker in this direction, however, is not prevented by the fact that the roll 107 is still in the low part of the cam, and as soon as the roll 110 is pushed out the feed rolls will separate. The time in the cycle at which this separation occurs can be adjusted by the screw 117 which changes the position of the roll 110 relative to its cam. Lowering the roll will cause the high part of the cam to reach it earlier, and raising it will cause the high part of the cam to reach it later and thereby delay the separation of the rolls and continue the feeding of the web a longer time. It is clear that this adjustment can be operated whether the machine be running or not.

Figure 13:
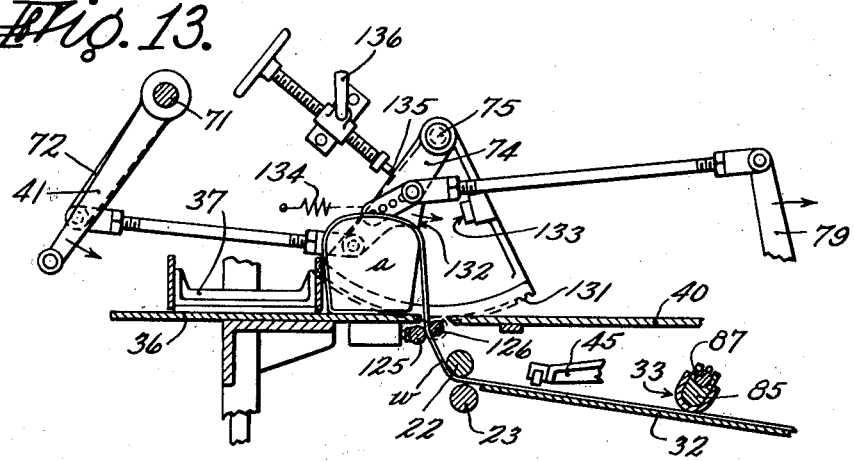
Figure 14:
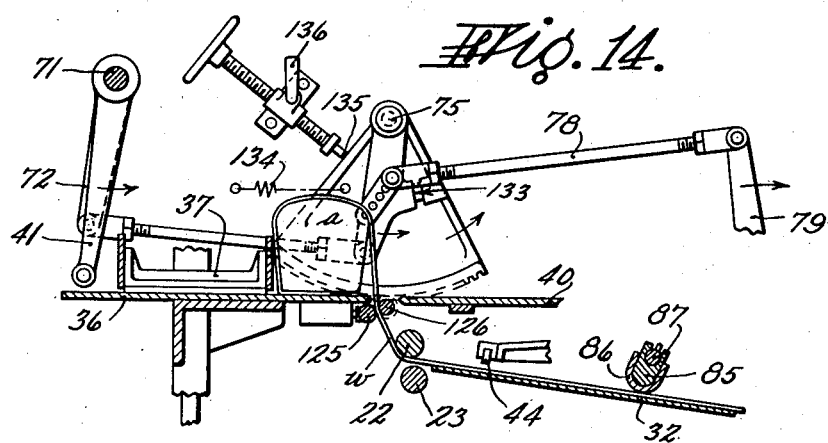
Figure 15:
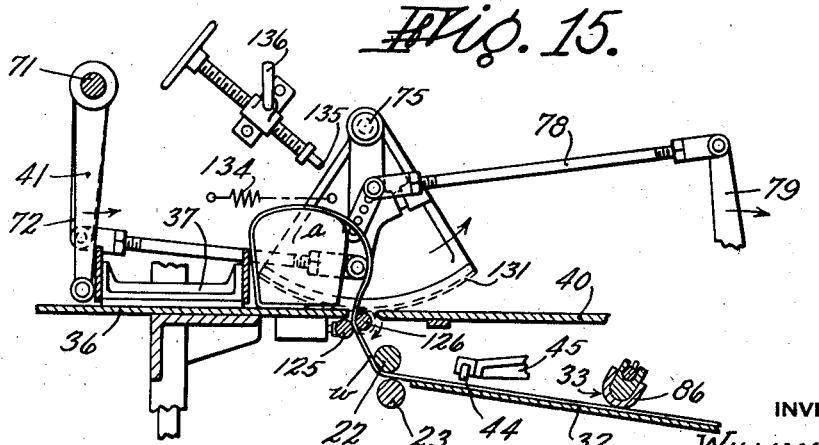

It is frequently desirable to vary the fullness of the wrap. The elevator 36 carries a roll 125 which, when the elevator is on a level with the floor 40, presses the web against a roll 126 extending completely across the end of the floor as shown in Fig. 17. This roll is free upon a shaft 127 and is coupled to it through a free wheeling clutch of a common type shown in Fig. 18. As the shaft is rotated in the direction of the arrow in Fig. 18, the outer member 129 of the clutch which is coupled to the roll 126 will also be rotated, but if the shaft is rocked in the opposite direction no movement of the roll will occur. The shaft carries at one end a pinion 130 (Fig. 11) adapted to be engaged by a toothed segment 131 (Fig. 13) freely rotatable on the shaft 75 which carries the arm 74. That arm carries an abutment 132 adapted to contact an abutment 133 on the segment as the arm is rocked in a counter-clockwise direction as viewed in Fig. 13. In this direction of movement the free-wheeling clutch 128 is operated to cause rotation of the roll 126. On the return stroke the segment is moved, as permitted by the receding abutment 132, under the influence of a spring 134 until it strikes an abutment screw 135 which may be adjusted as desired and clamped by a handle 136. The effect of a shift in this abutment is to vary the length of the inactive rearward swing of the segment and therefore to vary the amount of the next succeeding active swing during which the roll 126 is rotated. It will be seen from Figs. 13 to 16 that as the roll 126 rotates it will coact with roll 125 to draw the web between the then separated rolls 22 and 23 assisted by the frictional pull of the upper roll. Until the article has actually passed onto the floor 40 as in Fig. 16 the amount fed out between the rolls 125 and 126 will cause a slackness in the wrapper which has been greatly exaggerated in the drawings for purposes of clearness. It can readily be seen that this mechanism may be adjusted during continued operation of the machine so that it may give either a very loose wrap by feeding a maximum excess of web, or may cause a snug wrap by feeding a length of web that is just sufficient to pass around the article, or the screw 135 may be set so that rack 131 is held inoperative at the extreme point of forward movement of abutment 132 of the lost motion connection, effecting a very tight wrapping.

To summarize the operation of the apparatus, the rolls 22 and 23 close upon the web and feed down a length of wrap while an article is still upon the feed platform 34. As the article is fed forwardly by the plunger 35 to grip the web between the article and the backing plunger 37, the rolls 22, 23 separate and the web will be fed out as required by the motion of the article by the snubbing action brought about by the binding of the web around the roll as shown in Fig. 8. During this period the retainer 33 rests upon the web. This retainer gives some tension to the web, avoids a tendency of the web to slip laterally if the load happens to be irregular in form, and prevents any tendency to backward movement of the web after the latter is cut. As the article is raised by the elevator so that the web straightens out, as shown in Figs. 9 and 10, the retainer is moved off the web subjecting the latter to the rearward pull of roll 30, so that the shortening of the distance between the far corner of the web and the rolls in the Figs. 9 and 10 will not cause slack and buckling of this portion of the web. The roll 30 has sufficient weight to draw back the web whenever permitted by the elevation of the retainer.

As the elevator approaches its top position the retainer is returned to web contacting position. At a predetermined point of the movement of the loaf onto floor 40, depending on the setting of screw 135 which controls the extent of the lost motion of abutment 132, the roll 126 starts its rotation to feed the slight excess of wrapper needed to give the desired character of wrap. The knives 42 and 43 then operate to sever the web, brake 44 operating to give increased tautness to the web during the severing operation. The lower knife bar 43 then descends and the cycle commences anew.

It will be seen that throughout the time when the wrapper web is being fed, during a portion of which the initial wrapping operations are being carried out, the operator has adequate control of the web to insure the desired character of the wrap. It will further be seen that this control is broadly secured by providing a constantly operable adjustment of the initial positive feed of the wrapper, subjecting the intermediate feed of the web by the movement of the article to uniform conditions of tension and by finally providing a constantly operable adjustment of an available means for positively feeding the terminal portion of the wrapper. A more uniform product is obtained and economies in operation are secured, as well as savings in material since the amount of overlap of the wrapper ends may be closely controlled.

What I claim is:

1. In a wrapping machine of the type having means to move an article to cause the latter to be encircled by the leading end portion of a wrapper web, web feeding means comprising positively acting initial feeding means for feeding the initial portion of the wrapper length, positively acting terminal feeding means for feeding the terminal portion of the wrapper length, the intermediate portion of the wrapper length being fed by said movement of the article, means to adjust the time of termination of the positive feeding operation of the initial feeding means, means to adjust the time of initiation of the positive feeding operation of the terminal feeding means, both said adjusting means being operable during the operation of the machine and means selectively operable to apply tension to the web during a predetermined portion of the web feeding movement of the article.

2. In a wrapping machine of the type having means to move an article to cause the latter to be encircled by the leading end portion of a wrapper web, web feeding means comprising positively acting initial feeding means for feeding the initial portion of the wrapper length, means operable during the operation of the machine to adjust the time of termination of the positive feeding operation of the initial feeding means, the web being thereafter fed by said movement of the article, and means selectively operable to apply tension to the web during a predetermined portion of the web feeding movement of the article.

3. In a wrapping machine of the type having means to move an article to cause the latter to be encircled by the leading end portion of a wrapper web, web feeding means comprising a pair of constantly rotating feed rolls for positively feeding an initial length of web to the article, means to separate said rolls, after a predetermined length of web has been fed thereby, to permit an additional length to be drawn from the web supply by the movement of the article, and means to adjust the duration of the positive feeding operation of the rolls, said adjusting means being operable during the operation of the machine.

4. In a wrapping machine of the type having means to move an article to cause the latter to be encircled by the leading end portion of a wrapper web, web feeding means comprising a pair of constantly rotating feed rolls for positively feeding an initial length of web to the article, means to separate said rolls, after a predetermined length of web has been fed thereby, to permit an additional length to be drawn from the web supply by the movement of the article, and means to adjust the time at which the feed rolls separate, said adjusting means being operable during the operation of the machine.

5. In a wrapping machine of the type having means to move an article to cause the latter to be encircled by the leading end portion of a wrapper web, web feeding means comprising a pair of constantly rotating feed rolls for positively feeding an initial length of web to the article, means to separate said rolls, after a predetermined length of web has been fed thereby, to permit an additional length to be drawn from the web supply by the movement of the article, said roll separating means including a cam and a pair of cam followers, and means to adjust the spacing of the cam followers to vary the duration of the positive feeding operation of the rolls.

6. In a wrapping machine of the type having means to move an article to cause the latter to be encircled by the leading end portion of a wrapper web, web feeding means comprising positively acting feeding members for advancing an initial length of web to the article, means for temporarily interrupting the positive feeding operation of the feeding members to permit an additional length of web to be drawn from the web supply by the movement of the article and means for adjusting the duration of the positive feeding operation of the feeding members during the operation of the machine.

7. In a wrapping machine of the type having means to move an article to cause the latter to be encircled by the leading end portion of a wrapper web, web feeding means comprising positively acting feed members for advancing an initial length of web to the article, means for interrupting the positive feeding operation of the feeding members, after a predetermined length of web has been fed thereby, to permit an additional length to be drawn from the web supply by the movement of the article, means for controlling the duration of the positive feeding operation of the feeding members, said last named means including a cam, a cam follower actuated by the cam to initiate the positive feeding operation of the members, a second cam follower actuated by the cam for terminating the positive feeding operation of the members and means operable during the operation of the machine to adjust the position of the second follower relative to the first follower.

8. In a wrapping machine of the type having means to move an article to cause the latter to be encircled by the leading end portion of a wrapper web, web feeding means comprising, a pair of constantly rotating feed rolls for positively feeding an initial length of web to the article, means to separate said rolls, after a predetermined length of web has been fed thereby, to permit an additional length to be drawn from the web supply by the movement of the article, take up means positioned between the web supply and the feed rolls, a device frictionally engaging the web between the feed rolls and the take up mechanism and operable to prevent backward motion of the web in response to the pull of the take up mechanism and means for inactivating said device during a predetermined part of the period of separation of the rolls to thereby subject the web to the backward pull of the take up mechanism to prevent the formation of slack therein.

9. In a wrapping machine of the type having means to move an article to cause the latter to be encircled by the leading end portion of a wrapper web, web feeding means comprising, a pair of constantly rotating feed rolls for positively feeding an initial length of web to the article, means to separate said rolls, after a predetermined length of web has been fed thereby, to permit an additional length to be drawn from the web supply by the movement of the article, take up means positioned between the web supply and the feed rolls, a frictional member positioned between the feed rolls and the take up mechanism, said member engaging the web at an angle inclined in the direction of web feed and mounted for a limited free pivotal movement in the plane of the travel of the web to prevent backward motion of the web in response to the pull of the take up mechanism and means to move said member out of contact with the web during a predetermined part of the period of separation of the rolls to thereby subject the web to the backward pull of the take up mechanism to prevent the formation of slack therein.

10. In a wrapping machine of the type having means to move an article to cause the latter to be encircled by the leading end portion of a wrapper web, web feeding means comprising, a pair of constantly rotating feed rolls for positively feeding an initial length of web to the article, means to separate said rolls, after a predetermined length of web has been fed thereby, to permit an additional length to be drawn from the web supply by the movement of the article, take up means positioned between the web supply and the feed rolls, a frictional member positioned between the feed rolls and the take up mechanism, a pivot upon which said member is mounted for a limited free pivotal movement in the plane of the travel of the web, said member engaging the web at an angle inclined in the direction of web feed to prevent backward motion of the web in response to the pull of the take up mechanism, and means to rotate said pivot an amount in excess of the free pivotal movement of the member thereon to move said member out of contact with the web during a predetermined part of the period of separation of the rolls to thereby subject the web to the backward pull of the take up mechanism to prevent the formation of slack therein.

11. In a wrapping machine of the type having means to move an article to cause the latter to be encircled by the leading end portion of a wrapper web, web feeding means comprising, a pair of constantly rotating feed rolls for positively feeding an initial length of web to the article, means to separate said rolls, after a predetermined length of web has been fed thereby, to permit an additional length to be drawn from the web supply by the movement of the article, take up means positioned between the web supply and the feed rolls, a frictional member positioned between the feed rolls and the take up mechanism, a pivot upon which said member is mounted for a limited free pivotal movement in the plane of the travel of the web, said member engaging the web at an angle inclined the direction of web feed to prevent backward motion of the web in response to the pull of the take up mechanism, means to rotate said pivot an amount in excess of the free pivotal movement of the member thereon to move said member out of contact with the web during a predetermined part of the period of separation of the rolls to thereby subject the web to the backward pull of the take up mechanism to prevent the formation of slack therein, and manually operated means to releasably lock the pivot in its last named position.

12. In a wrapping machine of the type having means to move an article to cause the latter to be encircled by the leading end portion of a wrapper web, web feeding means comprising, a pair of constantly rotating feed rolls for positively feeding an initial length of web to the article, means to separate said rolls, after a predetermined length of web has been fed thereby, to permit an additional length to be drawn from the web supply by the movement of the article, take up means positioned between the web supply and the feed rolls, a device frictionally engaging the web between the feed rolls and the take up mechanism and operable to prevent backward motion of the web in response to the pull of the take up mechanism, means for inactivating said device during a predetermined part of the period of separation of the rolls to thereby subject the web to the backward pull of the take up mechanism to prevent the formation of slack therein, and means operative after the said device has been returned to frictional engagement with the web to advance the web a predetermined amount to control the tightness of the wrap.

13. In a wrapper feed mechanism of the type in which the leading end of a web is fed to an article and wrapped therearound by the advance of the article, means to subject the web to a backward pull to remove the slack therefrom, a pair of rolls operative thereafter and prior to the completion of the encirclement of the article by the wrapper, to advance the web a predetermined amount to control the tightness of the wrap, and means to adjust the duration of the feeding operation of said rolls.

14. In a wrapper feed mechanism of the type in which the leading end of a web is fed to an article and wrapped therearound by the advance of the article, a freely rotatable roll positioned to engage the inner side of the web adjacent the last corner of the article to be encircled by the web, a shaft, a second roll mounted on said shaft and against which the web is pressed by said first roll as the article is moved to complete its encirclement by the web, said second roll having a free wheeling connection with the shaft, a rack and pinion drive for the shaft, an adjustable lost motion connection between the rack and the article moving means, whereby said second roll is driven during a predetermined portion of the last mentioned movement of the article to control the tightness of the wrap.

15. In a wrapper feed mechanism of the type in which the leading end of a web is fed to an article and wrapped therearound by the advance of the article, a freely rotatable roll positioned to engage the inner side of the web adjacent the last corner of the article to be encircled by the web, a shaft, a second roll mounted on said shaft and against which the web is pressed by said first roll as the article is moved to complete its encirclement by the web, said second roll having a free wheeling connection with the shaft, a rack and pinion drive for the shaft, a lost motion connection between the rack and the article moving means, the initial point of said connection being adjustable, whereby said second roll is driven during a predetermined portion of the last mentioned movement of the article to control the tightness of the wrap.

WILLIAM HOPPE.